United States Patent [19]

Weik

[11] 4,062,298

[45] Dec. 13, 1977

[54] ANTI RATTLE TRACK FITTING

[75] Inventor: Kirby B. Weik, Litchfield, Conn.

[73] Assignee: UOP Inc., Des Plaines, Ill.

[21] Appl. No.: 740,626

[22] Filed: Nov. 10, 1976

[51] Int. Cl.² .......................... B60P 7/08; B65J 1/22
[52] U.S. Cl. ................................ 105/482; 244/118 R; 248/503
[58] Field of Search ............................. 105/475–485; 244/118 R; 24/243 B, 279; 292/251; 248/119 R, 499, 500, 503, 505

[56] References Cited

U.S. PATENT DOCUMENTS

| 3,241,501 | 3/1966 | Watts | 280/179 R X |
| 3,306,234 | 2/1967 | Hansen et al. | 105/476 |
| 3,377,040 | 4/1968 | Hansen | 244/118 R X |
| 3,800,713 | 4/1974 | Nordstrom | 244/118 R X |

Primary Examiner—Albert J. Makay

Attorney, Agent, or Firm—James R. Hoatson, Jr.; Barry L. Clark; William H. Page, III

[57] ABSTRACT

Track fitting for anchoring seats or cargo to a slotted floor track in an aircraft includes a plurality of spaced lobe portions which are adapted to be positioned so as to underlie retaining portions of the track to restrict upward movement of the fitting. Forward movement is restricted by shear pin means positioned so as to engage the track immediately adjacent one of the lobe portions. In a preferred embodiment, the shear pin is slidably movable vertically into and out of engagement with the floor track. An angled slot in the shear pin body is engaged by a pin which is movable fore and aft by rotation of a threaded member to cause the shear pin to be completely removed from the floor track or forced against it so as to pre-load the fitting and prevent it from rattling.

5 Claims, 6 Drawing Figures

U.S. Patent  Dec. 13, 1977  4,062,298
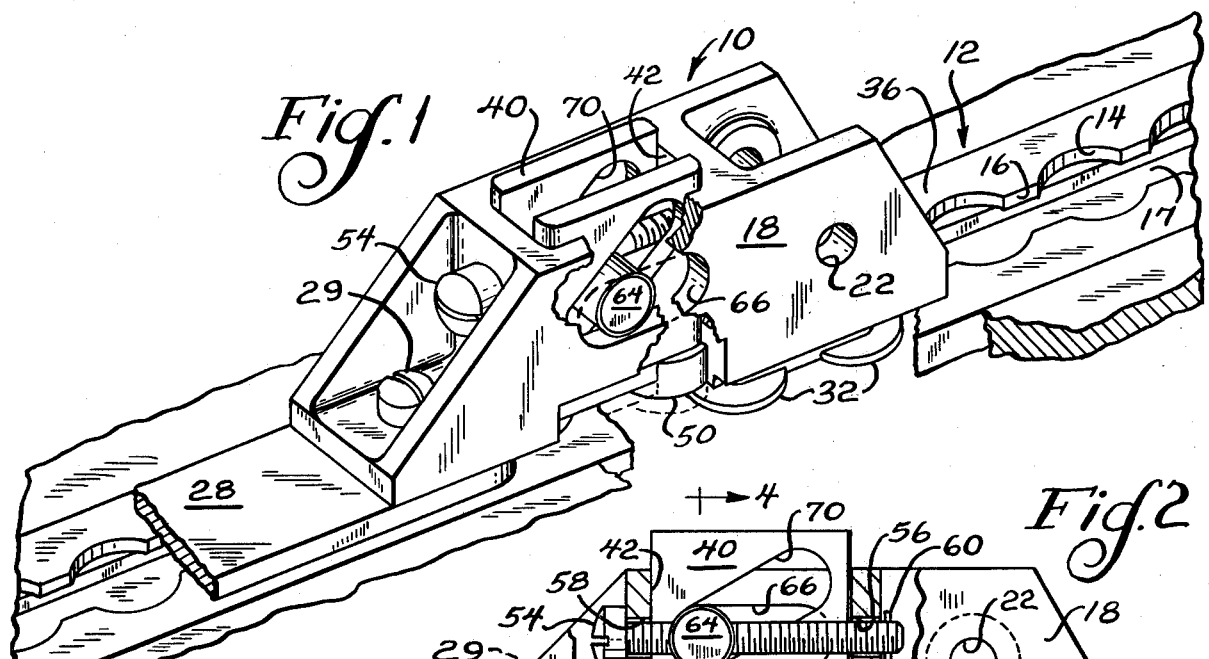
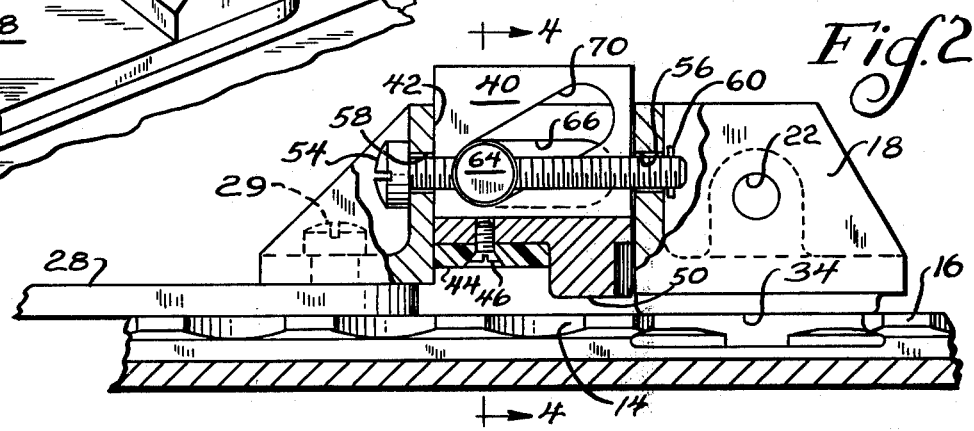
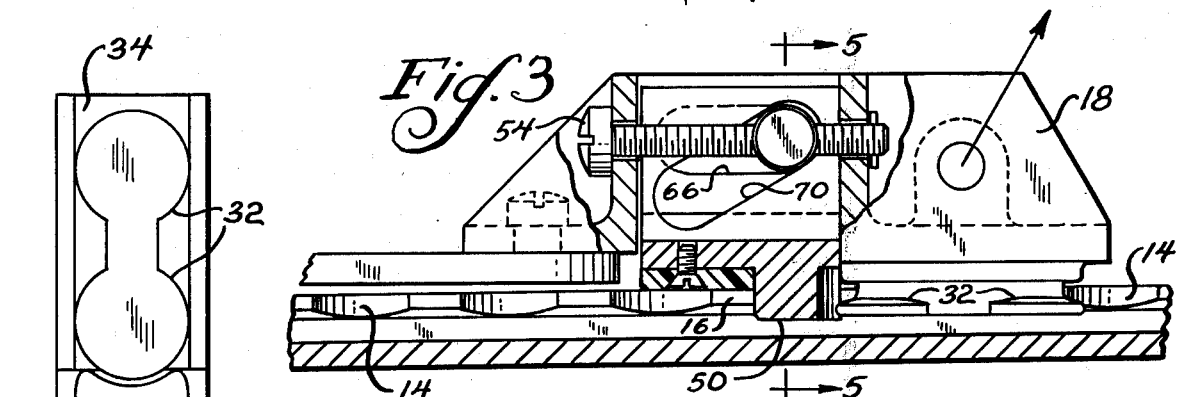
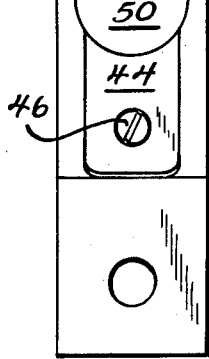
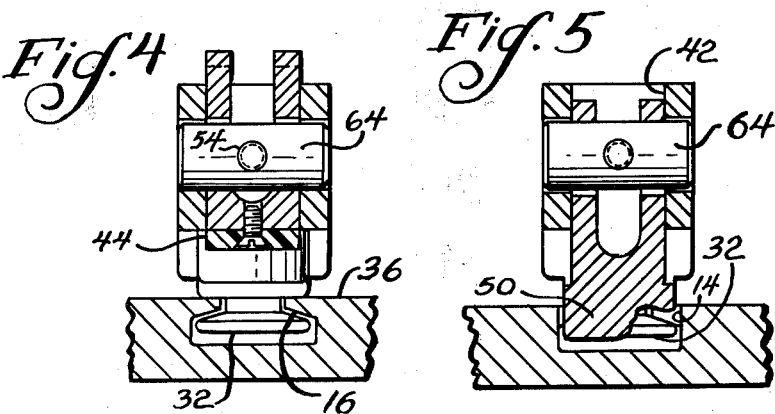

ANTI RATTLE TRACK FITTING

BACKGROUND OF THE INVENTION

The invention relates to track fittings for use in anchoring loads to the floor of aircraft. Typically, an aircraft floor includes a plurality of parallel, longitudinally slotted, channel-like tracks arranged flush with the floor down the length of the interior. The tracks have alternate wide and narrow openings which are commonly spaced at a one inch pitch so that fittings for anchoring seats or cargo can be located at any desired multiple inch increment along the length of the track. The fittings and associated track must typically be able to support 4000 pound vertical and 3600 pound horizontal loads. One commercially available fitting which meets these requirements comprises a housing which carries a vertically movable shear pin and an operating handle therefor at its forward end and a pair of threaded, headed retaining studs on one inch centers at its rearward end. The headed studs are adapted to be slid under retaining lips in the track and the shear pin is then lowered into the wider openings in the track to prevent forward movement. A transverse aperture is located in the housing midway between the studs for attaching a load to the fitting. The lockable fittings being discussed are usually, when used on a seat, only used on the rear legs of the seat. The front legs are usually attached to the rear legs by a metal strap member and to the seat track by non-lockable fittings. In order to facilitate mounting of the fittings to the floor track it is customary to provide a small amount of clearance between the interengaging portions of the fitting and the floor track. Unfortunately, the clearance often permits the seat to rattle in the track or be moved slightly by fore or aft forces applied to it by its occupants.

SUMMARY

It is among the objects of the present invention to provide an economically produced aircraft track fitting which can be quickly and easily locked to a floor track to provide positive locking and elimination of the possibility of rattling.

The foregoing and other objects are attained by the track fitting of the present invention which is constructed as set forth hereinabove in the Abstract. By mounting the support means for the shear pin for vertical adjustable movement in response to rotation of a horizontal non-axially movable threaded adjustment screw, it is possible to force the shear pin support means into contact with the slotted floor track. Thus, any possibility of rattling is prevented and the fitting is additionally locked against small fore and aft movements in response to small loads applied by the seat occupants.

BRIEF DESCRIPTION OF THE DRAWINGS

FIG. 1 is a partially broken away isometric view of the improved track fitting in assembled relation to a slotted floor track;

FIG. 2 is a side view of the track fitting with its shear pin retracted;

FIG. 3 is a side view of the track fitting with the shear pin in its operative position;

FIG. 4 is a sectional view of the track fitting taken on line 4—4 of FIG. 2;

FIG. 5 is a sectional view of the track fitting taken on line 5—5 of FIG. 3;

FIG. 6 is a sectional view of the track fitting taken on line 6—6 of FIG. 3.

DESCRIPTION OF THE PREFERRED EMBODIMENT

Referring to FIG. 1, the improved track fitting indicated generally at 10 is shown in operative relationship with a slotted floor track indicated generally at 12 having a bottom wall portion, side wall portions, and top portions in which are formed a plurality of circular or concave wide openings 14 which are spaced from each other on one-inch centers and separated by retaining lip portions 16 which define a narrow space 17 between the retaining lip portions on opposite sides of the track. The track fitting 10 includes a housing portion 18 which is preferably formed of cast aluminum. The upper central portion of the housing 18 has a transverse aperture 22 extending therethrough. The aperture 22 is the point at which loads are attached to the fitting such as by means of a pin (not shown) passing through the aperture. Where the fitting is used to support the rear leg of a seat the opposite sides of the leg would extend generally in the direction of the arrow in FIG. 3 so as to overlie the aperture 22 and would be attached thereto by means of a bolt, for example. Where the fitting 10 is to be used to attach cargo to the floor of the aircraft, a clevis type member (not shown) can be attached to the aperture 22 with the cargo being attached to the fitting by means of straps or cables anchored to the clevis. When the fitting 10 is to be used to anchor a seat, the front and rear legs (not shown) of the seat are generally tied together by means of a spreader member 28 which is attached to the fitting by means of a threaded fastener 29, for example. The spreader 28 firmly ties the rear legs and lockable fitting 10 to the front legs and thus obviates the need for any lockable fitting on the front leg.

A pair of lug members 32 extend downwardly from the track fitting 10. The lugs, which may be integrally formed with the fitting 10, such as by casting or be attached thereto such as by a threaded fastening means, project downwardly from the lower flat surface 34 of the fitting. The lugs are adapted to pass downwardly through the enlarged openings 14 in the track 12 and then be slid longitudinally of the track to a location underneath the lip portions 16 as the lower surface 34 of the fitting is slid over the upper surface 36 of the track 12. The positions of assembly and use are shown in FIGS. 2 and 3 respectively.

A shear pin support block 40 is mounted for vertical adjustable movement in guide aperture 42 in the housing 18. The support block 40 includes a wear plate 44, preferably made of nylon, which is attached to it by means of a fastener 46. The wear plate 44 is adapted to engage the top surface 36 of the track 12 and apply a binding force against it to lock the fitting 10 to the track when a shear pin portion 50 is in locking engagement with the walls of one of the openings 14 as shown in FIG. 3. Movement of the support block 40 is accomplished by means of an adjusting screw 54 which is freely mounted for movement in bearing portions 56, 58 in the housing 18. Longitudinal movement of the screw 54 is prevented by means of a cotter pin 60 which passes through the end of the screw. A drive pin 64 has a threaded opening positioned transversely of its axis which is in threaded engagement with the adjusting screw 54. The pin 64 has its ends positioned in a pair of horizontal slots 66 in the housing 18 and is thereby prevented from being rotated as the screw 54 is turned.

The pin 64 also passes through a pair of angled slots 70 in the support block 40. Since the pin 64 is constrained to a straight line fore and aft movement in the horizontal slots 66 it is obvious from FIGS. 2 and 3 that rotation of the screw 54 and the consequent fore and aft movement of the pin 64 will cause the support block 40 to be moved up and down relative to the housing 18. When the block is up as shown in FIG. 2, the shear pin 50 is out of engagement with the opening 14 so that the lugs 32 can be freely positioned underneath the lips 16. Once the lugs 32 are moved to the position underlying lip portions 16 as shown in FIG. 3 the shear pin 50 can be lowered into the opening 14 by rotation of the screw 54. As the wear plate 44 is brought into contact with the top surface 36 of the track 12 by the cam action of pin 64 and slots 70, the entire housing 18 will be slightly cocked as the lug members 32 are lifted upwardly into contact with the underside of the lips 16, thereby firmly locking the fitting to the track and preventing its rattling.

I claim as my invention:

1. A track fitting for use with a slotted floor track of the type used in aircraft wherein said track has a bottom portion, vertical side portions, and top portions carried by each of said side portions and defining the side edges of a longitudinal slot which overlies the bottom and is spaced therefrom, so as to define an open channel, said top portions on each side of said slot being formed so as to define a plurality of alternately spaced retaining lip portions and concave relieved portions, said track fitting comprising an elongated housing having a length at least as great as the axial distance between three of said spaced retaining lip portions, aperture means in an upper portion of said housing for anchoring a load to said fitting, a plurality of lobe members extending downwardly from said housing, said lobe members being shaped so as to be capable of being dropped vertically through a plurality of said concave relieved portions in said track and then moved axially with said housing along the track to bring said lobe members under the retaining lip portions, shear pin means mounted for vertical movement in said housing, said shear pin means being capable of being moved downwardly into a selected one of said plurality of concave relieved portions in said track when said lobes underlie said retaining lip portions and contacting the edges of said concave relieved portions to restrict horizontal movement of said fitting in said track while said lobe members contact the underside of said retaining lip portions to restrict upward movement, said shear pin means including a body portion having a first slot therein, said body portion having vertical side walls slidingly engagable with a recess in said housing, a drive pin mounted transversely of both said first slot in said body portion and a second slot in the housing, said first and second slots being at an angle to each other, and threaded drive means engagable with said pin to move said pin simultaneously along each of said first and second slots, the movement of said drive pin in one direction causing a portion of said shear pin means to move vertically into engagement with a portion of said track to cause said housing to be moved vertically into binding engagement with said track.

2. The track fitting of claim 1 wherein said first slot is at an angle to the top portion of said track and said second slot is parallel to said top portion of said track.

3. The track fitting of claim 1 wherein said fitting includes a pair of lobe members.

4. The track fitting of claim 1 wherein said shear pin means includes a wear plate portion which is adapted to bear against the top surface of said track when said drive pin is moved in said one direction.

5. The track fitting of claim 1 wherein said threaded drive means comprises a screw which is mounted for rotation in a pair of spaced openings in said housing, said screw having an enlarged head on one end and a retaining member on the other end to prevent it from moving axially relative to said housing.

* * * * *